July 19, 1955     F. W. E. HOESELBARTH     2,713,356
APPARATUS FOR WEAVING PILE FABRICS
Original Filed Oct. 24, 1950     15 Sheets-Sheet 1
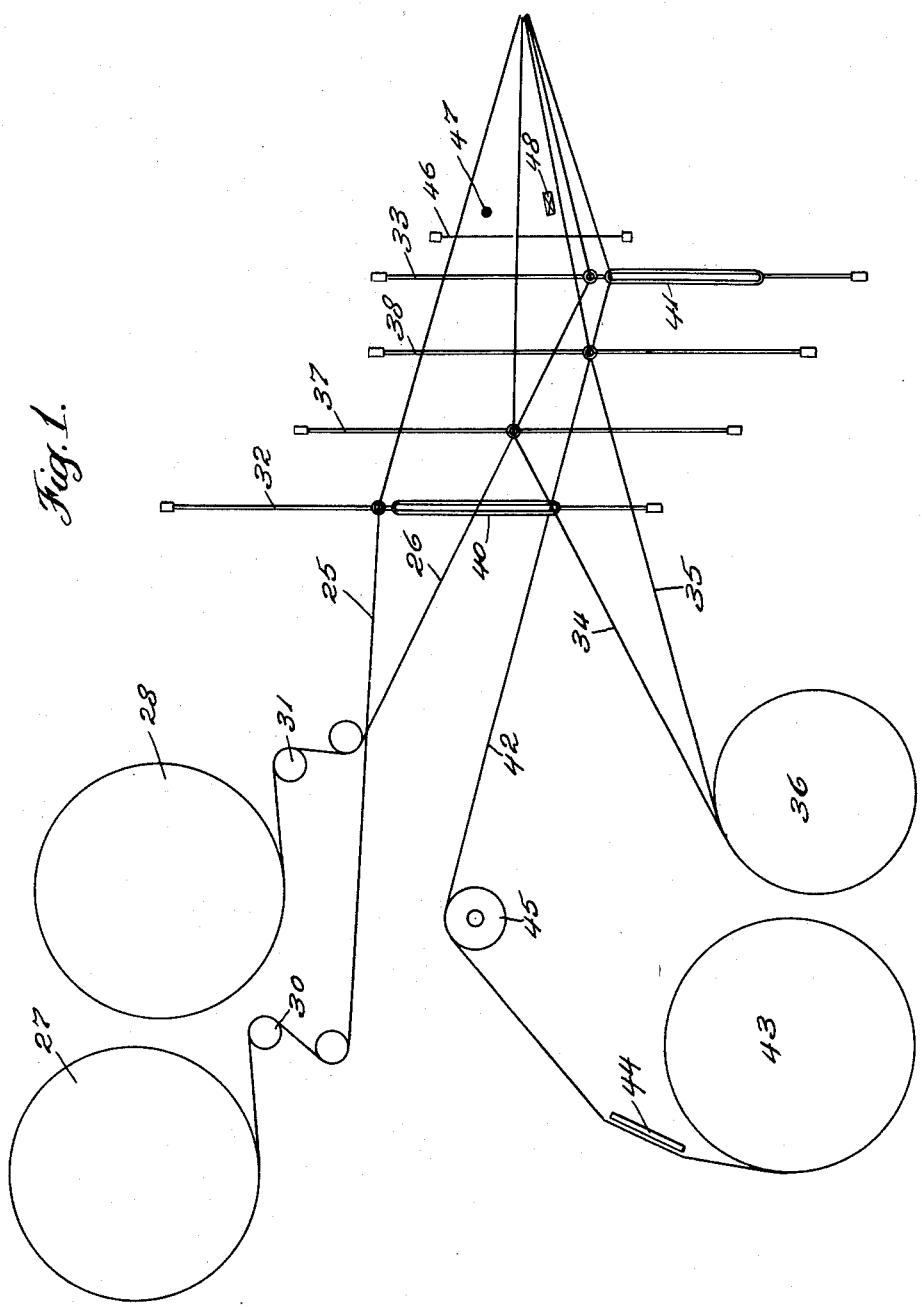
INVENTOR
Franz W.E. Hoeselbarth.
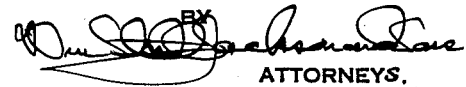
ATTORNEYS.

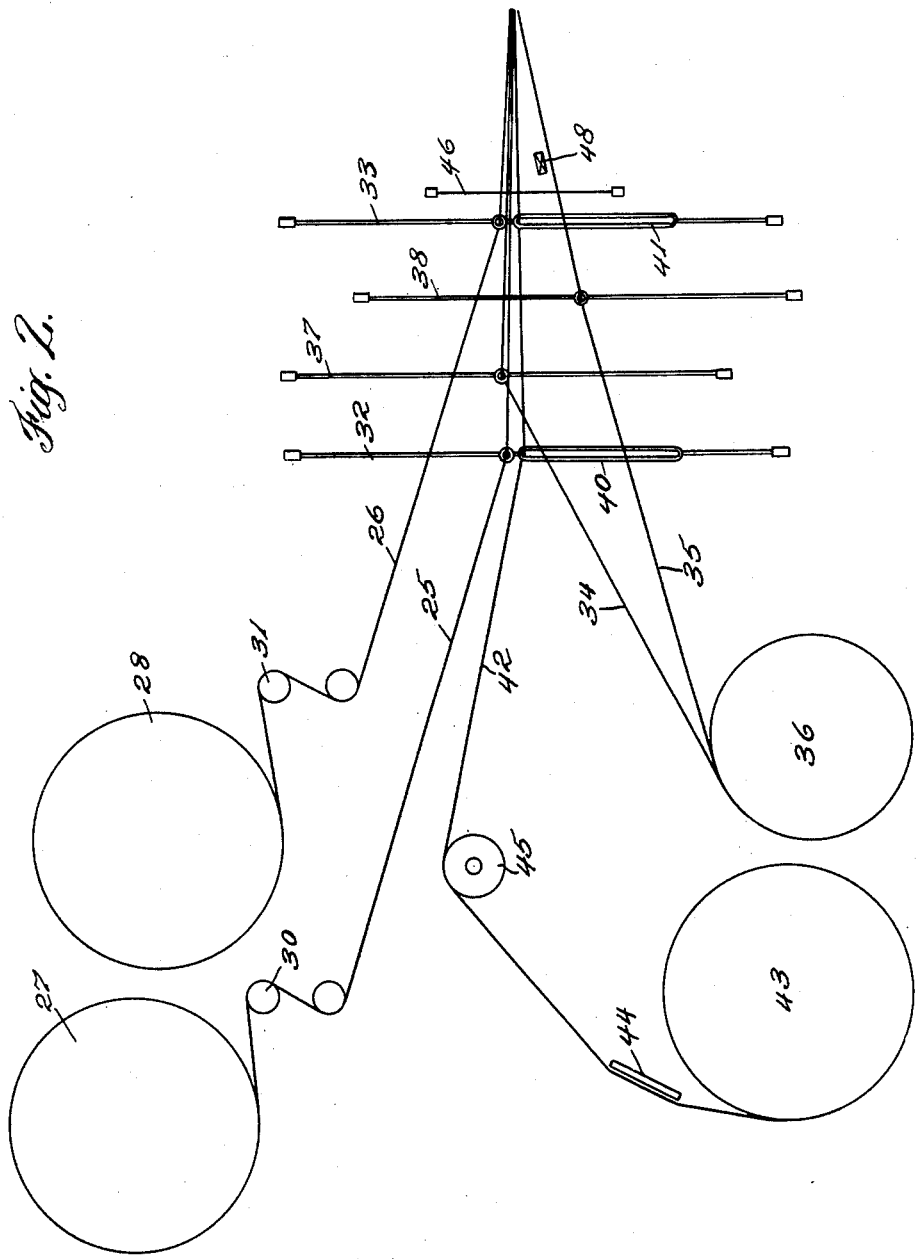

July 19, 1955     F. W. E. HOESELBARTH     2,713,356
APPARATUS FOR WEAVING PILE FABRICS Original Filed Oct. 24, 1950     15 Sheets-Sheet 3

*Fig. 3.*

INVENTOR
Franz W. E. Hoeselbarth.
BY
ATTORNEYS.

July 19, 1955 F. W. E. HOESELBARTH 2,713,356
APPARATUS FOR WEAVING PILE FABRICS
Original Filed Oct. 24, 1950 15 Sheets-Sheet 4

INVENTOR
*Franz W. E. Hoeselbarth.*
BY
ATTORNEYS.

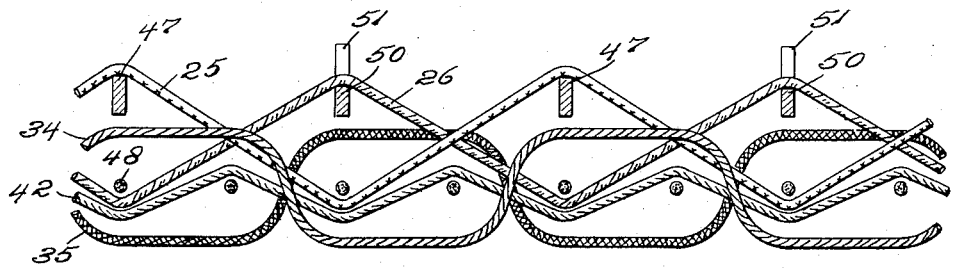
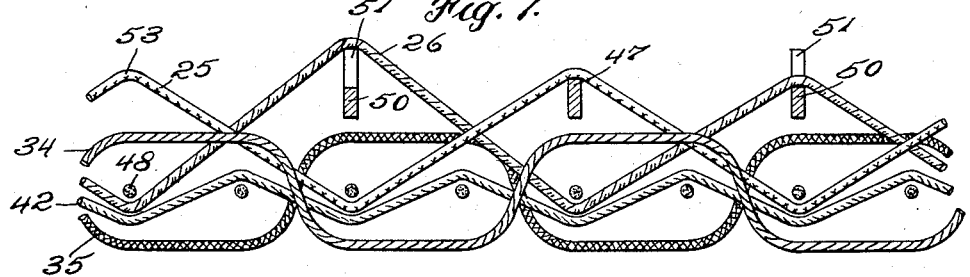
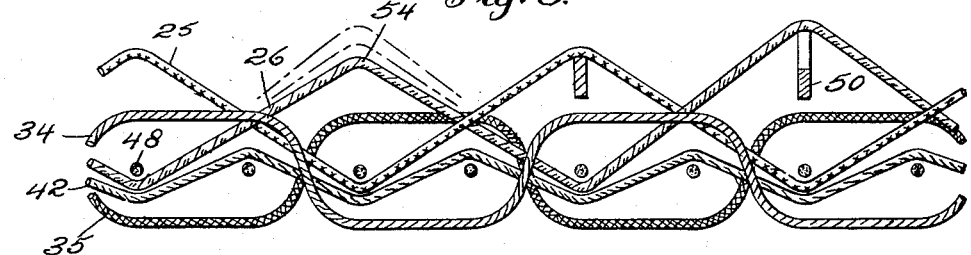
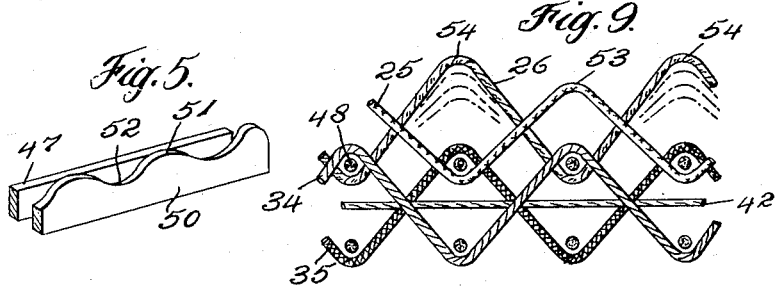
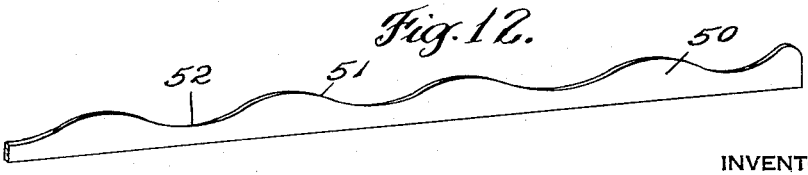
INVENTOR
Franz W. E. Hoeselbarth.
BY
ATTORNEYS.

July 19, 1955　　　F. W. E. HOESELBARTH　　　2,713,356
APPARATUS FOR WEAVING PILE FABRICS Original Filed Oct. 24, 1950　　　　　　　15 Sheets-Sheet 6

INVENTOR
Franz W. E. Hoeselbarth.
BY
ATTORNEYS

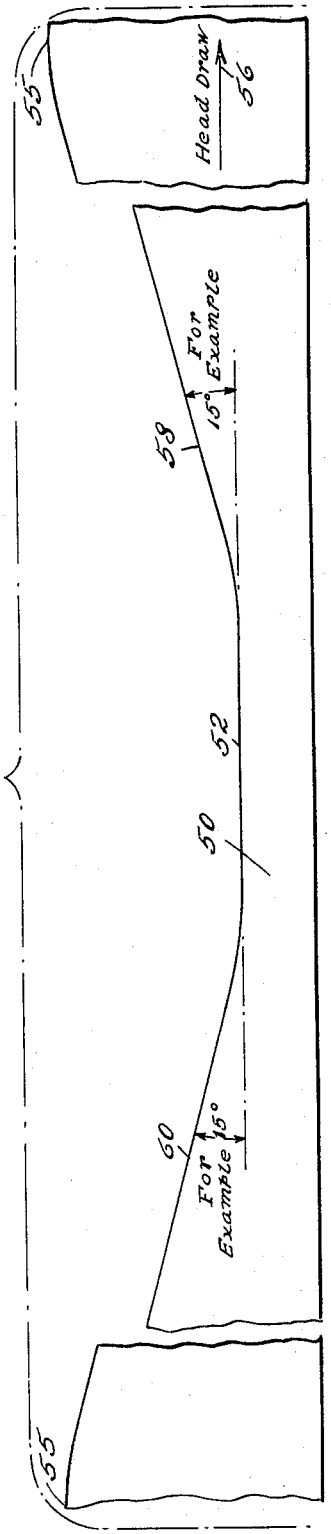
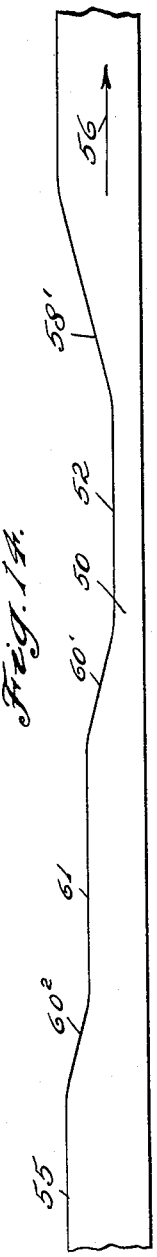

July 19, 1955 F. W. E. HOESELBARTH 2,713,356
APPARATUS FOR WEAVING PILE FABRICS
Original Filed Oct. 24, 1950 15 Sheets-Sheet 8
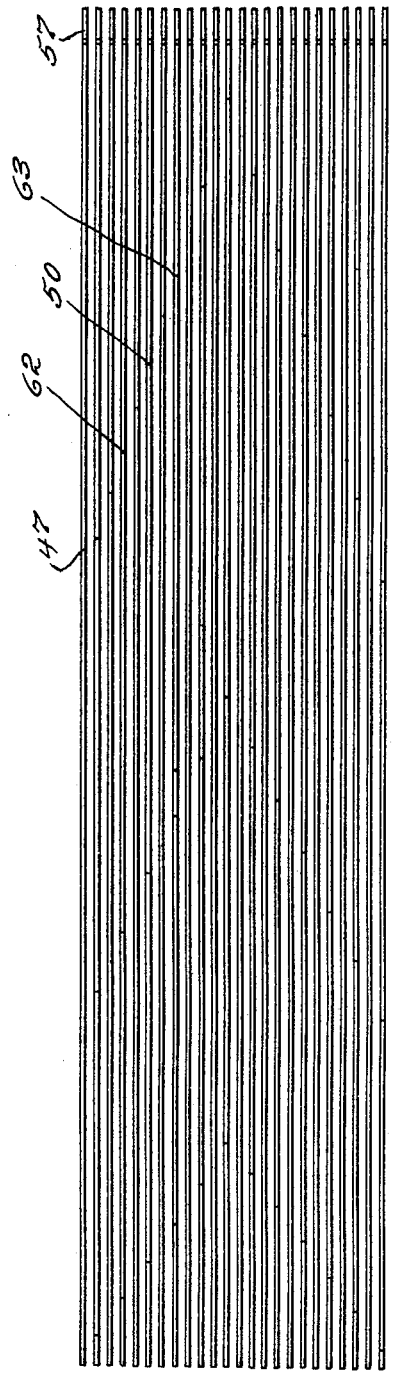
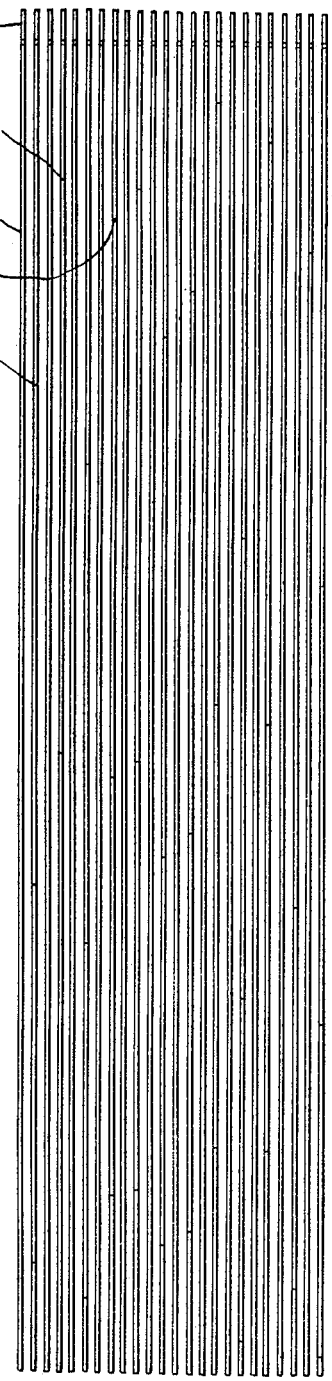
INVENTOR
Franz W.E. Hoeselbarth.
BY
ATTORNEYS July 19, 1955  F. W. E. HOESELBARTH  2,713,356
APPARATUS FOR WEAVING PILE FABRICS
Original Filed Oct. 24, 1950  15 Sheets-Sheet 9

INVENTOR
Franz W.E. Hoeselbarth.
BY
ATTORNEYS.

July 19, 1955     F. W. E. HOESELBARTH     2,713,356
APPARATUS FOR WEAVING PILE FABRICS Original Filed Oct. 24, 1950                              15 Sheets-Sheet 13

INVENTOR
Franz W. E. Hoeselbarth.
BY
ATTORNEYS

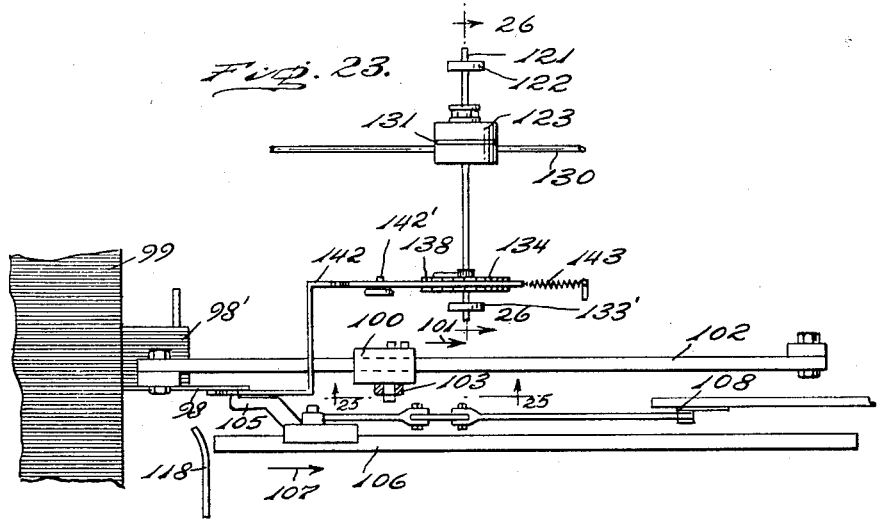
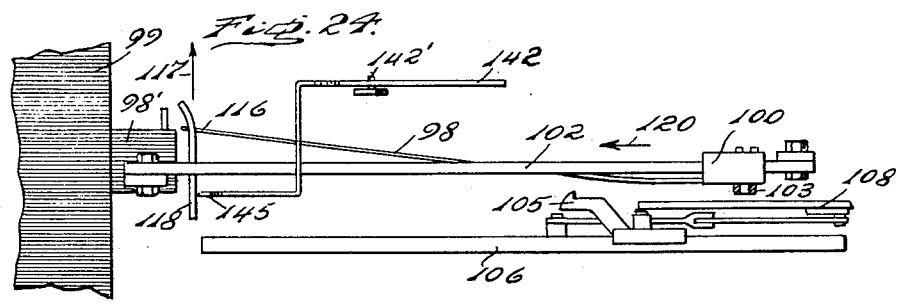
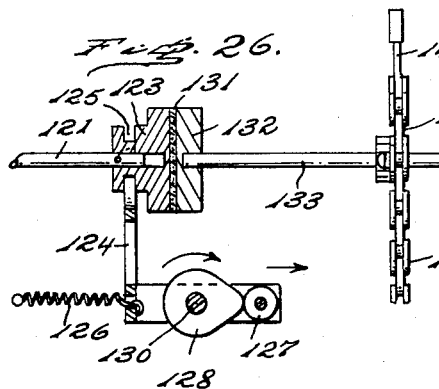
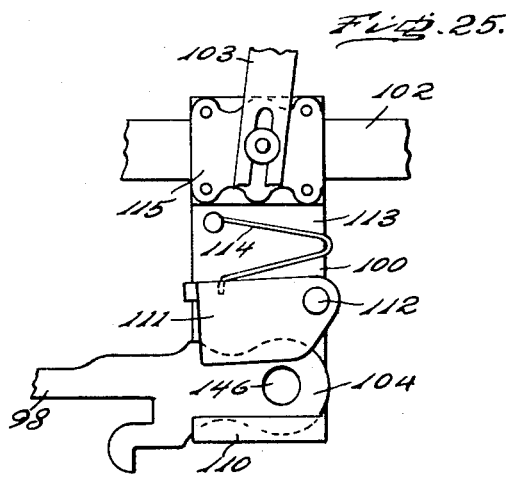
INVENTOR
Franz W.E. Hoeselbarth
BY
ATTORNEYS.

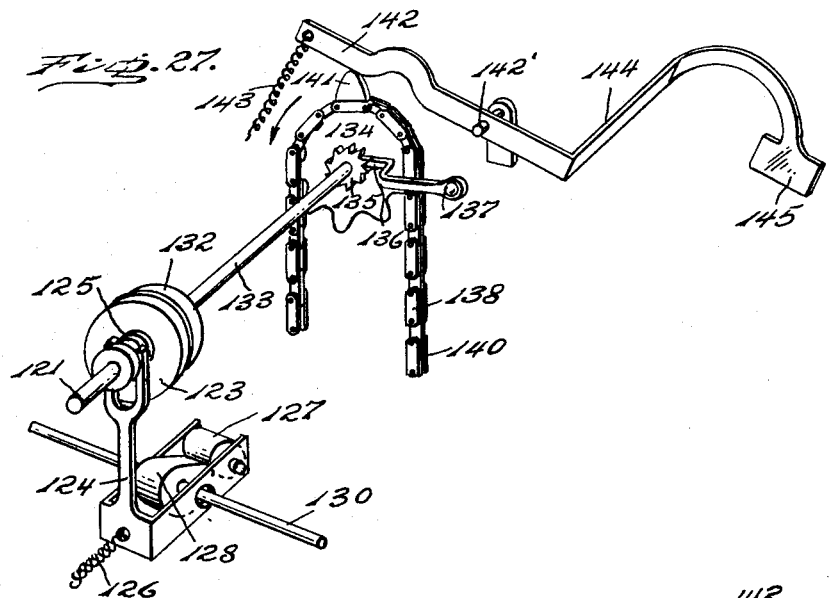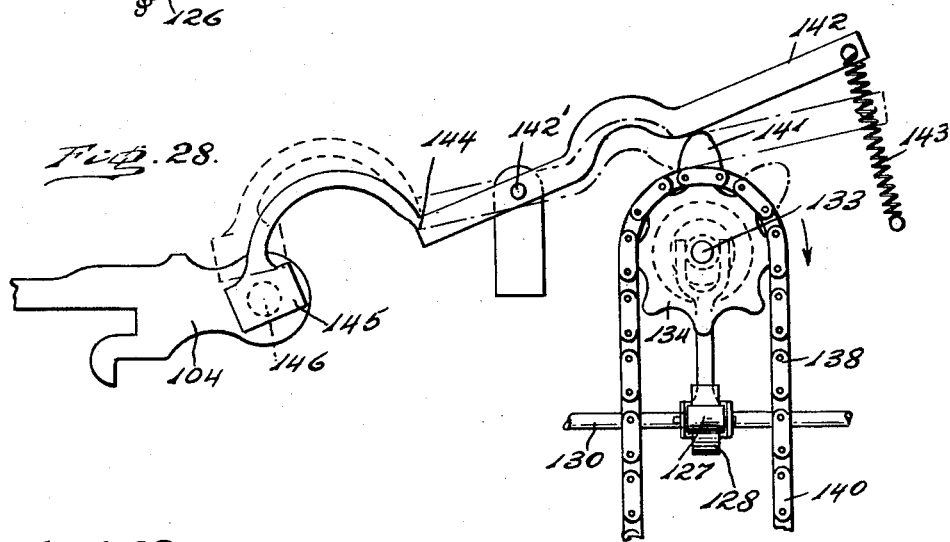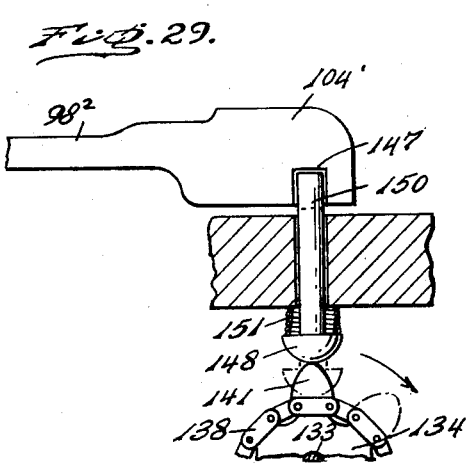

United States Patent Office 2,713,356
Patented July 19, 1955

2,713,356

APPARATUS FOR WEAVING PILE FABRICS

Frank W. E. Hoeselbarth, Carlisle, Pa., assignor to C. H. Masland & Sons, Carlisle, Pa., a corporation of Pennsylvania Original application October 24, 1950, Serial No. 191,830. Divided and this application March 10, 1952, Serial No. 275,758

2 Claims. (Cl. 139—41)

The present invention relates to weaving pile fabrics especially carpets and rugs having various heights of pile in the same transverse row.

The present application is a division of my U. S. application Serial No. 191,830, filed October 24, 1950, for Weaving Pile Fabric Having High and Low Loops. The present application is directed to the apparatus, the claims to the fabric being retained in the parent application and the claims to the method and the wires used therein being embodied in a separate divisional application Serial No. 275,757, filed March 10, 1952, for Weaving Pile Fabric Having High and Low Loops.

A purpose of the invention is to weave a pile fabric such as a carpet or a rug having alternate rows of pile projections which are straight and wavy or varying in height, to maintain the wavy pile projections partially or wholly uncut, while employing optionally cut or uncut straight pile projections in the alternate rows, partially or wholly to mask the straight pile projections by the high wavy pile projections so that the straight pile projections form a base or background, and to further partially or wholly mask the low wavy pile projections by the straight pile projections in the background.

A further purpose is to create a dominating effect and a succession of diminishing background effects in a wavy pile carpet or rug, the dominating effect being achieved by the high wavy pile projections, the intermediate effect being achieved by the straight lower pile projections and the subordinate effect resulting from the low wavy pile projections which are partially masked by the straight pile projections.

A further purpose is to shear the high wavy pile projections while leaving the lower wavy pile projections including the pile projections of intermediate heights unsheared.

A further purpose is to apply the wavy pile to one of a plurality of pile warps and the straight pile to another such pile warp, weaving permissibly with a pattern change mechanism such as a jacquard, but preferably weaving according to the velvet (including the tapestry) pile carpet system without a jacquard.

A further purpose is to employ three or more successive levels for different groups of the wavy pile in each transverse row.

A further purpose is to make the low wavy pile projections lower than the straight pile projections so that they are practically completely masked.

A further purpose is to vary the raising of piles over alternate wires to raise a given pile over wires of a different character in a particular pattern area without the necessity of using a jacquard.

A further purpose is to alternate wires of different character in one pattern area and at intervals throughout the fabric to place wires of the same character in successive positions to change the manner of alternation.

A further purpose is to omit the insertion of wires at intervals in a wire set having alternating wires of different characters to change the character of wire over which a given pile warp is raised.

A further purpose is to employ pile warp ends of different colors in each pile warp and to create pattern effects by raising the piles over different wires of a wire set having alternate wires of different characters.

A further purpose is to employ a gradual slope on both the forward and rearward upper inclined edges of a wire so as to avoid roughening of the fabric during withdrawal of the wire.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figures 1 to 4 are warpwise conventional weave diagrams illustrating the successive steps in a complete weave cycle which may be employed in the present invention.

Figure 5 is a sectional perspective of a pair of alternating wires which are used in making up the complete wire set in the invention. It may be considered that these wires are employed in the weave of Figures 1 to 4.

Figures 6, 7 and 8 are conventional warpwise weave diagrams of the completed fabric before the wires are withdrawn and at progressive stages during the withdrawal of the wires.

Figure 9 is a conventional warpwise weave diagram showing the front and back wefts in the completed fabric as produced after the wires are withdrawn in Figures 6, 7 and 8.

Figure 12 is a detailed perspective of a wavy wire which may be employed in the invention.

Figures 13 and 14 are enlarged fragmentary detail side elevations of variant forms of wavy wire employed in the invention.

Figures 15 and 16 are diagrammatic plan views of wire sets which may be used in the invention, Figure 16 being a variation of Figure 15.

Figure 4:
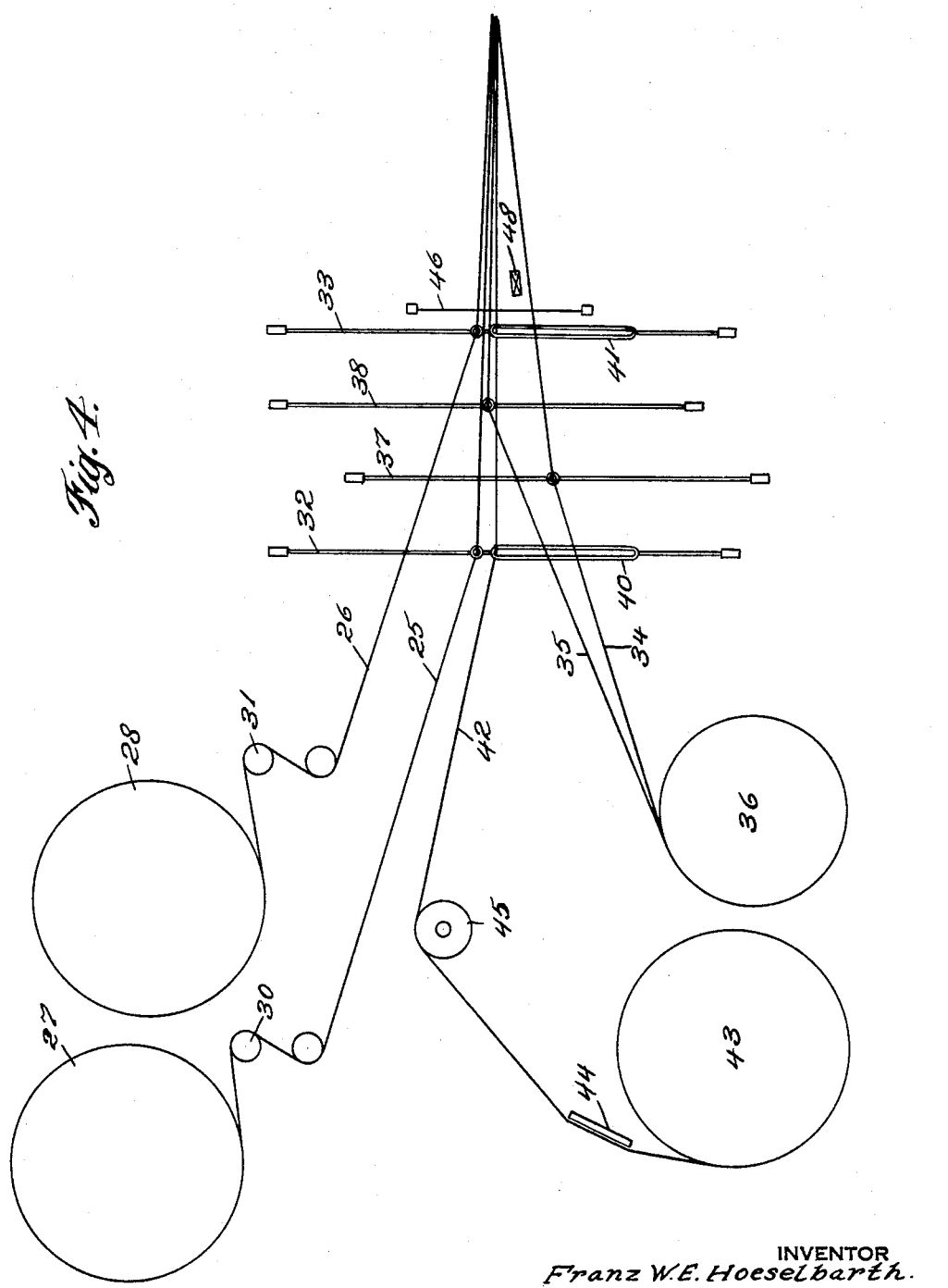

Figures 23 to 28 inclusive show a wire motion which can be used in accordance with the present invention.

Figure 23 illustrates the withdrawal of the last wire at the spike roll side of the set of wires, the illustration being in diagrammatic top plan view.

Figure 24 is a diagrammatic top plan view of the wire motion showing the insertion of a wire in the shed.

Figure 25 is a fragmentary enlarged side elevation showing the hopper grasping the head of a wire, looking in the direction of the line 25—25 in Figure 23.

Figure 26 is a digrammatic enlarged section of Figure 23 on the line 26—26.

Figure 27 is a fragmentary diagrammatic perspective of the pattern chain and associated wire miss mechanism.

Figure 28 is an enlarged fragmentary right end elevation of Figure 27.

Figure 29 is a fragmentary diagrammatic vertical section showing a variant form of wire motion in accordance with the invention. This is a variation of the motion of Figures 23 to 28 inclusive.

In the drawings like numerals refer to like parts throughout.

Describing in illustration but not in limitation and referring to the drawings:

As shown by C. H. Masland, 2nd, U. S. patent application Serial No. 144,764, filed February 17, 1950, now abandoned, for Weaving With Effect From Orientation Of High And Low Pile and my U. S. patent application Serial No. 167,534, filed June 12, 1950, for Velvet or Tapestry Weave Loom and Velvet or Tapestry Carpet Fabric, advantage may be gained in achieving novel effects in pile fabrics, especially carpets and rugs, by weaving over wires varying in height along the length of the individual wire, which are referred to herein generally as wavy wires.

In accordance with the present invention which constitutes a further development of the applications above referred to, I have discovered that an improved effect may be achieved by alternating straight wires and wavy wires which are raising different pile warps, and by using the high pile projections formed over the wavy wires to create a dominating effect, while achieving a background effect by the uniform pile projections and using the uniform pile projections to partially or wholly mask the low wavy pile projections. Thus the user sees a pattern accomplished by the high pile projections, while at the same time he is aware of a background effect from the uniform pile projections. The low wavy pile projections may form either a subordinate background visible in the combined effect, or may be practically or entirely masked by the low uniform pile projections.

In addition to the effects described, I desirably superimpose a further effect by shearing the highest wavy pile projections, while leaving all other wavy pile projections unsheared. In this case the pattern effect of the wavy pile projections which stand out above the background is itself interthreaded by a subordinate pattern at the dominant level due to the contrast between the sheared tufts and the lower wavy pile loops.

A further pattern effect in accordance with the invention can be achieved by reversing the alternation of the wires with respect to the pile warps. This should be employed with warps of different appearances (colors) and preferably the warps having ends of different colors in a particular warp. This may be achieved by placing wires of the same character (wavy or straight) in adjoining positions at a point of reversal, or by omitting a wire and therefore omitting pile in a given transverse row at the point of reversal. Thus the result can be achieved by varying the wire set or by varying the loom mechanism or the process of weaving. In this way stripes, blocks or other banded or rectangular patterns can very conveniently be obtained.

The wires in accordance with the invention will have gradual slopes in both the forward and rearward direction where level is changed at the tops of the wires to avoid roughening the fabric during withdrawal of the wires.

While the invention may be employed in Wilton, Brussels or other jacquard weaving, it is believed to find its greatest effect in velvet carpet, by which I mean to include tapestry carpet. Weaving in accordance with the velvet carpet system, and employing a plurality of pile warps, suitably two or more, one of which is raised over wires of uniform height and another of which is raised over wavy wires, I am able to achieve an intermingled or combined result from the various pattern elements.

The low portions of the wavy wire in the best embodiment of the invention will not extend higher than the uniform height of the straight wire, and in many embodiments of the invention where it is desired to completely or wholly mask the low wavy pile projections, will be substantially lower than the uniform height.

While the uniform wavy wire may to advantage be a sine or other wave, it will preferably be a series of plateaus or flats of different heights, suitably two, three or more heights, with intermediate merging surfaces.

Considering now the weave of the preferred embodiment, Figures 1 to 4 inclusive show the four steps of a single cycle of a velvet or tapestry carpet weave in accordance with the invention, it being understood that each succeeding cycle will ordinarily be a repetition of the steps shown. While the weave can be accomplished with a single binder warp, it is preferred to use two binder warps in the present invention.

In Figure 1 I illustrate two pile warps 25 and 26 which are withdrawn respectively from beams 27 and 28 through tensioning devices 30 and 31 and manipulated by the eyes of pile warp heddles 32 and 33. While two pile warps only are shown, it will be evident that as long as a plurality of pile warps are employed, any suitable number of pile warps may be used in the weave of the invention.

Binder warps 34 and 35 are withdrawn from a binder warp beam 36 over a suitable tensioning device, not shown, and are respectively manipulated by binder warp heddles 37 and 38.

A stuffer warp or warps will ordinarily be employed, and these are preferably manipulated, as explained in my application above referred to, by long slots 40 and 41 depending beneath the eyes of pile warp heddles 32 and 33. Stuffer warp 42 is withdrawn from stuffer warp beam 43 through tensioning device 44 and carried over guide 45 which is located high enough with respect to the shed so that the stuffer warp ends will not hang below the tops of the long slots when they are held in the half raised position by the long slots. It is preferable to have the guide located high enough so that the angle of the stuffer warp ends above the horizontal in the positions of Figures 2 and 4 will be not less than about 15°. It will be evident that by the procedure shown, the use of an extra heddle is saved, although of course the weave can be accomplished by using an extra stuffer warp heddle.

A reed is shown at 46.

In the first step of the cycle shown in Figure 1, pile warp heddle 32 is fully raised, pile warp heddle 33 is lowered, binder warp heddle 37 is half raised and binder warp heddle 38 is lowered. An upper shed is formed between pile warp 25 in fully raised position and binder warp 34 in half raised position. A lower shed is formed between binder warp 34 raised half way and binder warp 35, pile warp 26 and stuffer warp 42 all in lower position. It will be evident that in Figure 1 the top of the long slot is low enough down to hold stuffer warp 42 in the lower position. A wire 47 is inserted in the upper shed and a shot of weft 48 is taken in the lower shed. The beat of the lay completes the first step.

In Figure 2 the position of the binder warp heddles is unchanged, pile warp heddles 32 and 33 are raised half way, and the tops of their long slots 40 and 41 hold stuffer warp 42 in the half raised position forming a lower shed. A shot of weft 48 is taken above binder warp 35 and beneath all other warps, and the weft is beaten up by the lay to complete the step.

In Figure 3, pile warp heddle 33 is fully raised, binder warp heddle 38 is raised half way, and pile warp heddle 32 and binder warp heddle 37 are lowered. An upper shed is formed beneath pile warp 26 and above binder warp 35 and all other warps, while a lower shed is formed beneath binder warp 35 and above pile warp 25, binder warp 34 and stuffer warp 42. The top of long slot 40 of pile warp heddle 32 holds the stuffer warp in lower position. A wire 50 is inserted in the upper shed and a shot of weft 48 is taken in the lower shed and both are beaten up by the lay to complete the step.

As shown in Figure 4, pile warp heddles 32 and 33 and binder warp heddle 38 are raised half way and binder warp heddle 37 is lowered, forming a lower shed beneath pile warps 25 and 26, binder warp 35 and stuffer warp 42 and above binder warp 34. The stuffer warp is held in the half raised position by the top of long slot 41 of pile warp heddle 33. A shot of weft 48 is taken in the lower shed and beaten up by the lay.

It will be noted that in accordance with the present invention and as best seen in Figures 5 to 8 and 12 to 16, the two wires 47 and 50 inserted alternately on each cycle are of different construction and operate on different warps. Considering Figures 5 to 8, it will be evident that pile warp 25 is raised over a straight wire 47 on each cycle, the wire 47 alternating with the wire 50 in the wire set. The straight wire 47 is of uniform height throughout, and is lower than the high points of wire 50. On each cycle also and alternating with wire 50, pile warp 26 is raised in the pile over wire 50. Unlike wire 47, wire 50 has an undulating or wavy upper surface 51 as best seen in Figures 5, 12, 13 and 14. It is in every case a so-called "round" or non-cutting wire and when it is withdrawn it does not sever the pile loops formed over the wire. Wire 47, on the other hand, may be either a cutting or a non-cutting wire as later explained.

An important relationship exists between the relative heights of the wires. The low portions 52 of wavy wire 50 are at least as low as the uniform height of straight wires 47. The exact height relationship can be varied to achieve different effects. For example, if it is desired to have the pile projections formed over the straight wires completely mask the low pile projections over the wavy wires, the low portions 52 of the wavy wires should be lower than the straight wires, but if it is desired to have only a partial masking effect the low portions of the wavy wires may be of the same height as the straight wires.

Figure 6 shows the fabric as woven prior to removal of any of the wires. Figure 7 shows the result after removing the left hand straight wire 47, forming a straight transverse row of pile projections 53 which may be cut or uncut as later explained, but are shown as uncut loops. Figure 8 shows the effect of removing one additional wire, resulting in raising the pile projections 54 to the height of the high points on the wavy wire when that wire is withdrawn, and then selectively pulling down these pile projections when the next wavy wire is withdrawn at the right in Figure 8, by an amount depending on the relations of the high and low points on the respective wavy wires. Dot-and-dash lines indicate varying heights of the resulting pile projections 54 formed over the wavy wire in the same transverse row.

Thus in the end, as shown in Figure 9, the fabric consists of alternating uniform rows of pile loops or tufts interspersed with wavy rows of pile loops whose low loops are not higher than the straight loops or tufts.

In accordance with good practice in the invention, the high wavy pile projections will be at least 25 percent higher than the uniform straight pile projections and preferably will be 50 percent higher but desirably not over 4 times the height of the straight pile projections. The low portions will conveniently be of the same height as the uniform pile projections or less than the uniform pile projections, for example 75 percent or 50 percent thereof.

The following are suitable examples of the relative pile dimensions which have been used successfully:

*Example I*

Wavy wire:
    High portions height_____ 0.331"
    Low portions height_____ 0.130"
Straight wire:
    Height _____ 0.160"

*Example II*

Wavy wire:
    High portions height_____ 0.330"
    Intermediate level height_____ 0.260"
    Low level height_____ 0.130"
Straight wire:
    Height _____ 0.130"

Typical examples of wire construction are shown in Figures 13 and 14. Figure 13 shows the low wire portion 52 and the high wire portion 55 on a wire having two levels or plateaus. In the direction 56 facing away from the wire head 57 (Figures 15 and 16), the interconnecting slope 58 between the high portion 55 and the low portion 52 is on a gradual angle limited to the order of 15° or less, while in the direction facing toward the head the interconnecting slope 60 between the low portion 52 and the high portion 55 should be similarly gradual as shown, and limited to the order of 15° or less. The reason for the gradual angle in the direction away from the wire head is that if this slope is not gradual, the next slope on the wire directed toward the wire head is likely to pull the slope loops formed over the reverse slope irregularly and form a rough appearance on the face of the fabric.

The wire of Figure 14 has three levels, including an intermediate level 61, the rear slope 58' and the forward slopes 60' and 60$^2$ between the low and the intermediate height and the intermediate and the full height being suitably gradual, limited to the order of 15° or less with respect to the wire longitudinal axis. The merging of the slopes with the plateaus is accomplished by gradual fillets as shown in the preferred embodiments.

Figure 10:
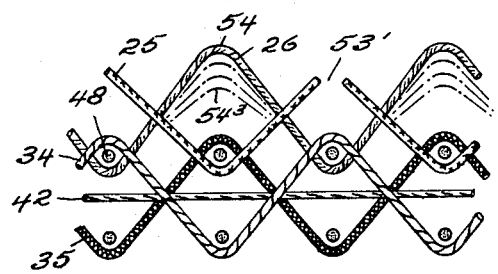
Figures 10 and 11 are warpwise fabric diagrams showing the completed fabric of Figure 9 slightly modified according to variations in the invention.

While the form of Figure 9 shows straight pile loops 53 on the pile 25, it will be evident that by employing a cutting wire at 47, cut straight pile tufts 53' are formed as in Figure 10.

Figure 11:
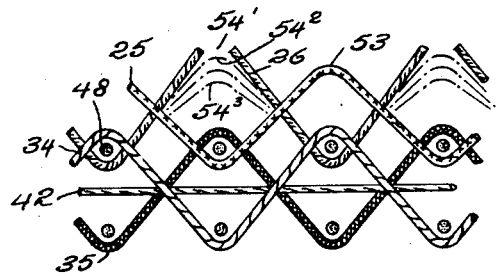

In some cases after the fabric is woven and after the wires have been withdrawn it may be desirable to shear the high points of the wavy pile projections. This may be done using shearing equipment of well known character, set merely to cut the highest wavy pile projections forming high tufts 54' (Figure 11), while the intermediate wavy pile projections 54$^2$ and the low wavy pile projections 54$^3$ remain uncut as shown. It is recognized that the cutting of high pile projections is not level per se (German Patent No. 273,602, of May 4, 1914), but it should be observed that in the fabric of the present invention this imparts an additional pattern effect to the high pile which contrasts in an attractive manner with the pattern effect between the high pile and the low pile and between the low pile and the partially masked wavy loops.

The relationship between the high and the low points on adjoining wavy wires can be arranged as desired to accomplish the required pattern effect. Figure 15 illustrates the top view of a wire set consisting of alternate straight wires 47 and wavy wires 50. The high points 62 of adjoining wavy wires are displaced longitudinally in the wire set to form a pattern, which in this case is a chevron effect 63. Any other suitable pattern arrangement of the high points of wavy wires may be employed, Figure 16 showing a random distribution of the high points to form a windblown pattern 64 in the wire set.

Figure 17:
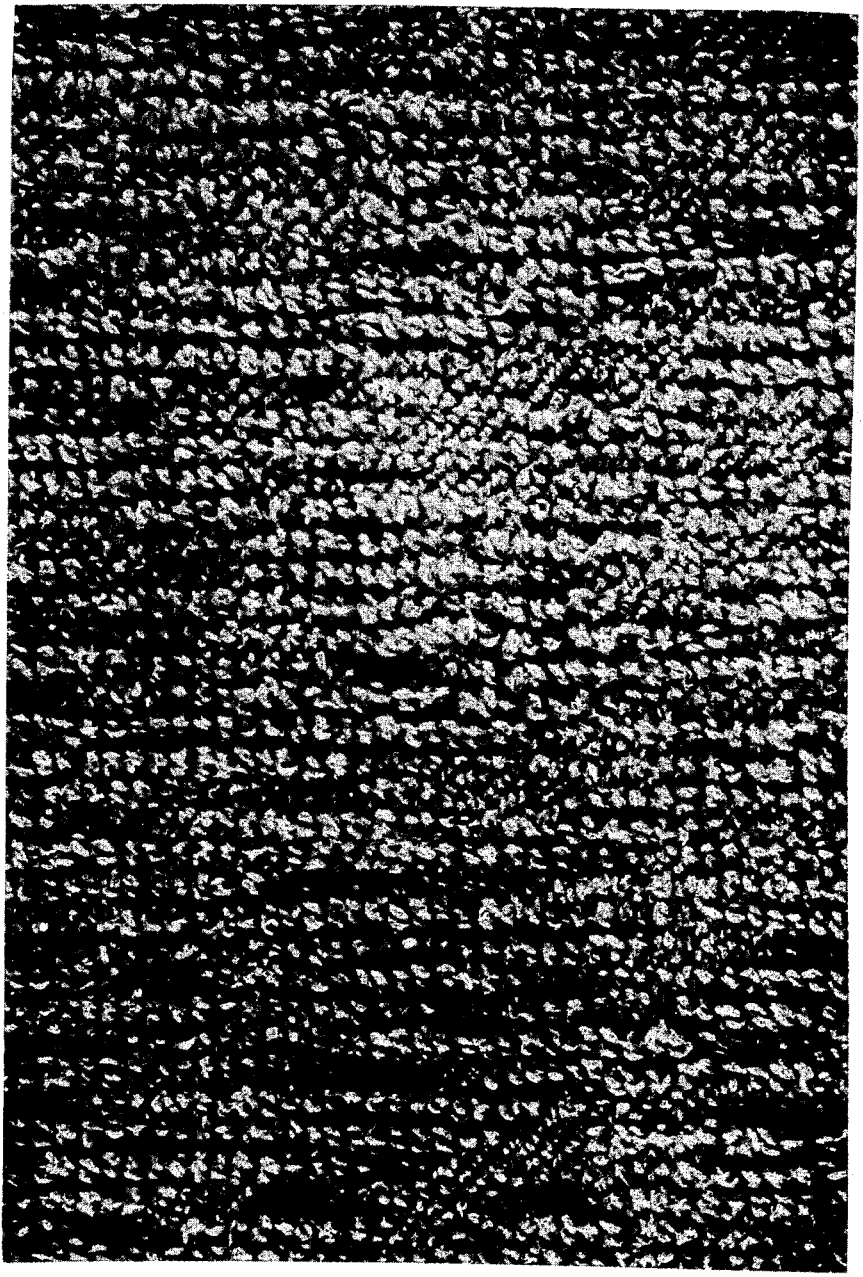
Figure 17 is a photographic view of the face of one of the fabrics of the present invention.
Figure 18:
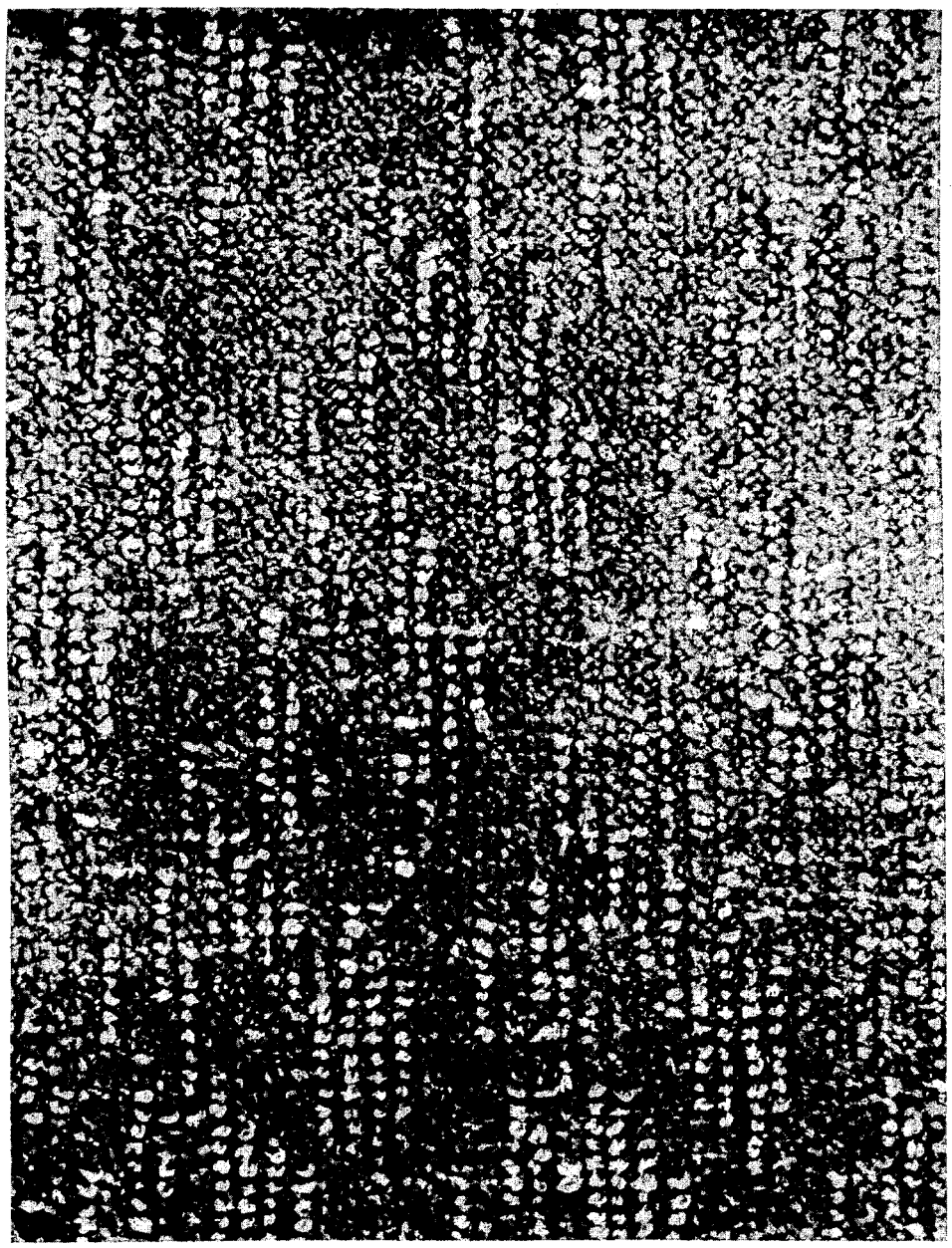
Figure 18 is a photographic face view of a variation in the fabric of the invention.

The resulting effects achieved by the invention are illustrated in Figures 17 and 18, showing velvet carpets having uncut pile throughout. These are both woven with the wire heights of Example I, and illustrate wavy pile transverse rows alternating with uniform pile projections, with the uniform pile projections partially or wholly masking the low wavy pile projections. The two forms differ in the pattern of the high pile and in the fact that the form of Figure 17 is woven without color contrast between the two pile warps whereas the form of Figure 18 is woven with color contrast to accentuate the effect obtained by the pile height contrast and by the masking action on the low wavy loop.

In some cases it is desirable to employ an additional pattern effect superimposed on the pattern effects already explained. It will be understood that this additional pattern effect will preferably be used with the masking feature of the low wavy loops, and with the cut or uncut uniform pile, and with the shearing of the high loops of the wavy pile. It is, however, possible to employ the pattern effect now to be discussed without restricting the uniform pile to a height equal to or in excess of the low wavy pile. Thus the present feature can be employed with or without the masking effect of the low wavy pile and using any desired relationship between the height of the uniform pile and the various heights of the wavy pile. The shearing of the high pile is also optional.

In accordance with the present features of the invention, the alternating straight wires and wavy wires operate on different pile warps throughout a pattern area, but a reversal takes place at the edge of a different pattern area, and different pile warps are raised over wires of a given character in the next pattern area. Then at the next succeeding pattern area there is a reversal back to the initial relationship between wires and pile warps.

This feature can be employed with any suitable character of contrasting pile warps, whether the contrast be in color or character or structure of yarn, and it can also be employed to great advantage with thread-in of different colors or other characters of pile warp ends in different dents of each of the warps.

Figure 19:
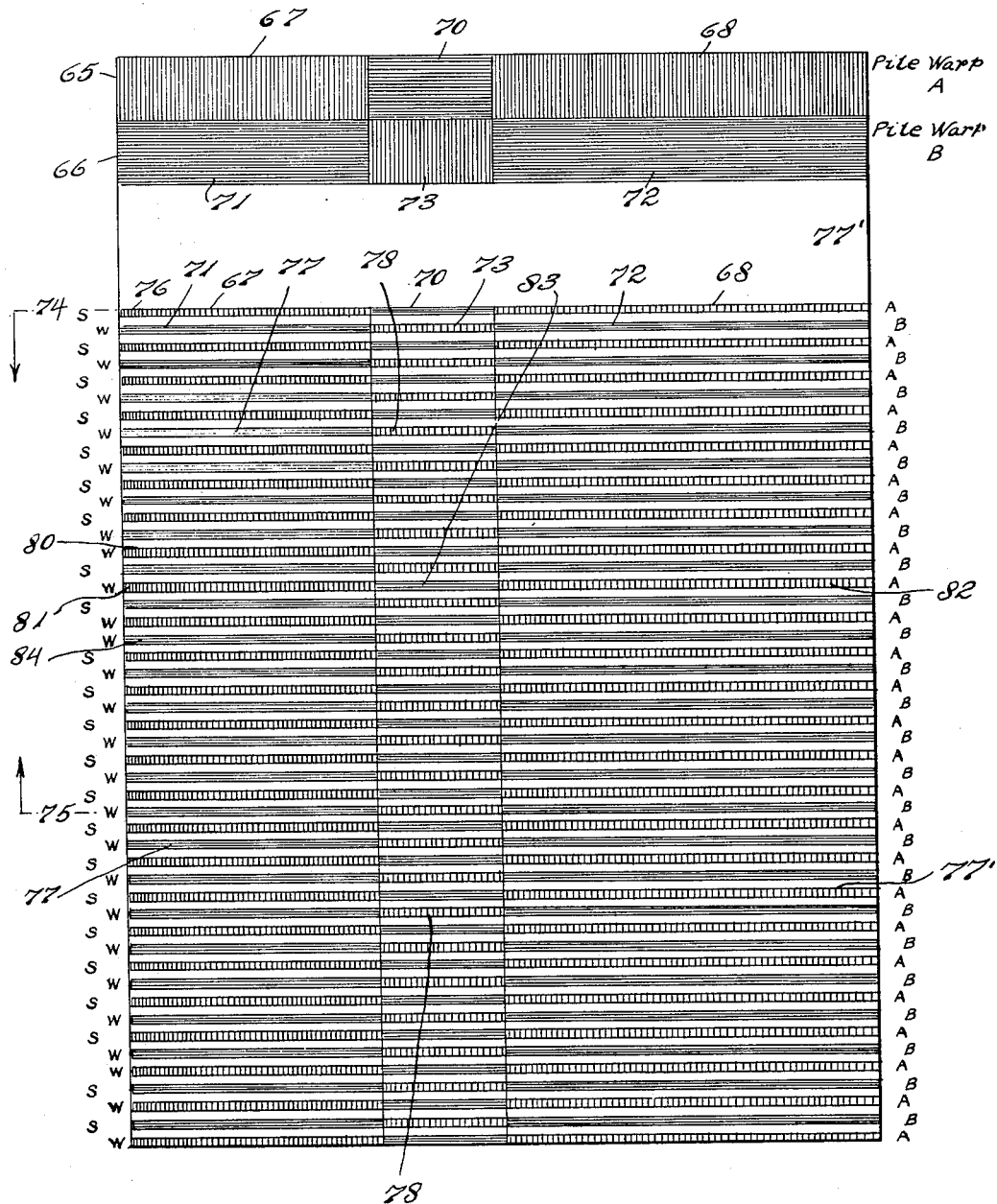
Figure 19 is a diagram of a variant form of weave in accordance with the invention showing changes in the alternation of the wires in the wire set.
Figure 20:
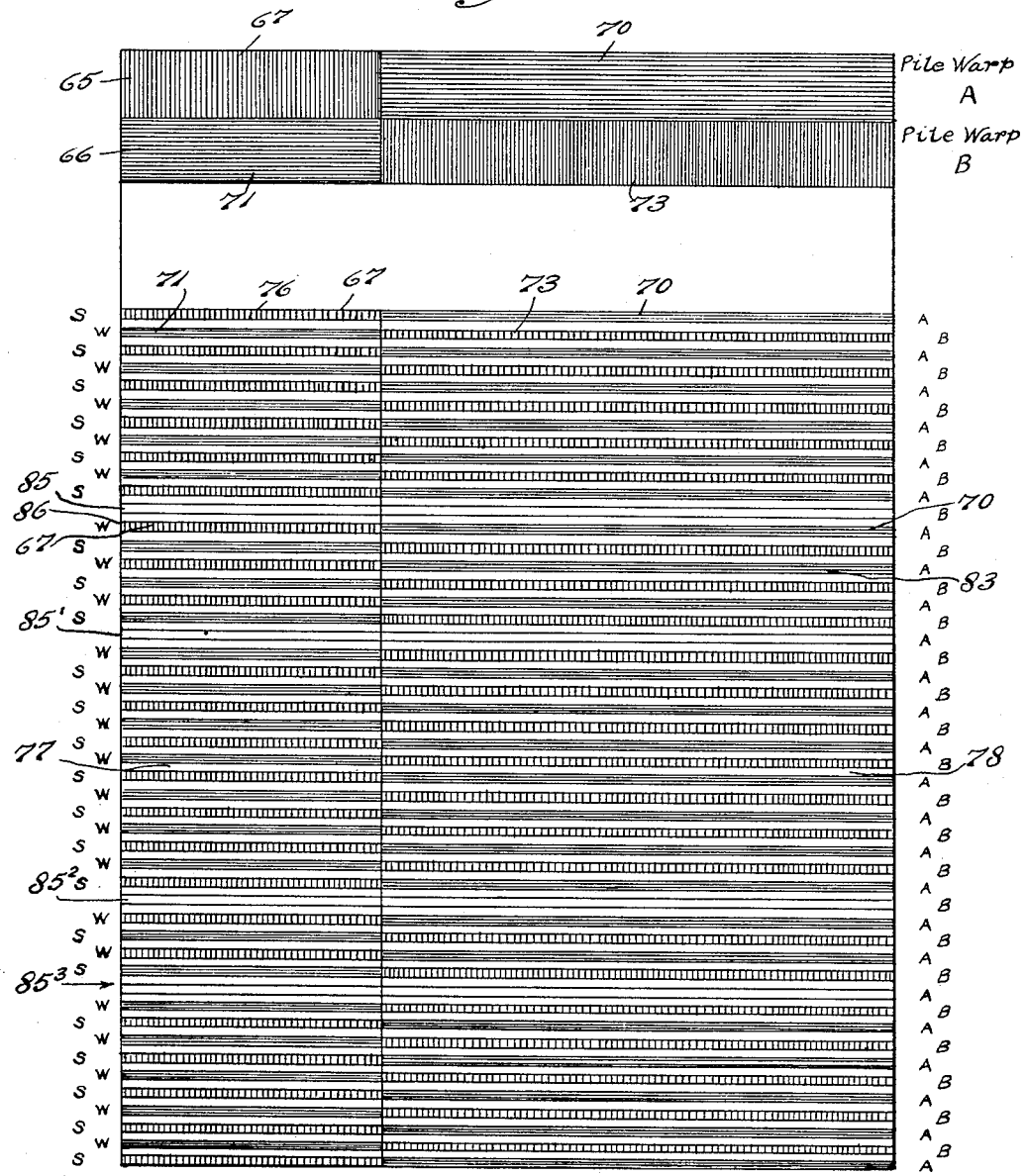
Figure 20 is a diagram similar to Figure 19 showing a different manner of accomplishing change in the alternation of wires.

To illustrate the difference in character, applicant has used in Figures 19 and 20 shading of one type to indicate one color, for example blue, and shading of another type to indicate another color, for example red. Thus at the top of Figure 19, band 65 extending weftwise indicates the thread-in of pile warp A on its beam and band 66 indicates the thread-in of pile warp B on its beam. In pile warp A, pile warp ends of one color, for example red, are threaded through dents 67 and 68 while intermediate dents 70 have pile warp ends of another color, for example blue. In pile warp B, dents 71 and 72 have pile warp ends of one color, for example blue, while intermediate dents 73 have ends of another color, for example red. The pile warp ends in all of the dents of pile warp B contrast in color with the pile warp ends in the corresponding dents of pile warp A.

The lower portion of the chart shows the pile warp ends which are raised over the different wires on successive cycles and indicate their color. The symbols S and W at the left indicate straight and wavy wires respectively and the symbols A and B at the right indicate pile warps A and B.

The wire repeat extends from 74 to 75. Thus over the first wire 76, a straight wire, pile warp A is raised, creating pile of one color, for example red, at dents 67 and 68 and of another color, for example blue, at dents 70. The next wire is a wavy wire as shown by the symbol W at the left, and it creates pile of one color, for example blue, at dents 71 and 72 and another color, for example red, at dents 73.

The same alternation between straight and wavy wires continues, with pile warp A always raised over the straight wires and pile warp B always raised over the wavy wires creating stripes of one color, for example blue, at 77 and 77', since the high wavy wire dominates the low uniform pile, and a stripe of another color, for example red, at 78.

When, however, wavy wire 80 is encountered, there is a change because wire 80 is a wavy wire immediately against a preceding wavy wire with no straight wire in between. This reverses the pile warps raised over wires of a particular character, since pile warp A is now raised over the wavy wire and pile warp B is in the background, being raised over the straight wire. This produces intervening bands 81 and 82 of one contrasting color, for example red, and band 83 of another contrasting color, for example blue.

These new bands formed by pile warp A continue until wire 84 is encountered, which again causes a reversal since there is a wavy wire immediately following a wavy wire. We now have new pattern areas 77 and 77' of one color, for example blue, and an intervening pattern area 78 of another color, for example red. This condition is maintained until a further reversal of the relationship of the wires to the pile warps is produced.

In the above example the wire set has included in it points of reversal of alternation of the wires. A similar result can, however, be accomplished as in Figure 20 by using a continuous alternation of wires in the wire set and omitting wires where it is desired to change the pile relationship to the wires.

The thread-in is similar, but the arrangement of the colors in the dents differs in width in Figure 20 from Figure 19. In this case you start with a straight wire 76 and follow with a wavy wire as indicated. Pile warp A is raised over the straight wire, forming pile projections of one color, for example red, at dents 67 and of another color, for example blue, at dents 70. The next wire is a wavy wire and forms pile projections of one color, for example blue, at dents 71 and pile projections of another color, for example red, at dents 73. This condition alternates until point 85 is reached, at which the wire hook is empty and no wire is inserted. Therefore no pile is raised and pile warp B at this point remains in the back of the fabric. In the next position there is a wavy wire 86, so that two wavy wires are adjoining. Over wavy wire 86 pile warp A is raised, creating pile projections of one color, for example red, at dents 67 and of another color, for example blue, at dents 70. This continues throughout the band 81 for one color, for example red, and the band 83 for another color, for example blue. At point 85' another wire is omitted and again there is a reversal in the relationship of pile wires and pile warps, reestablishing the same condition which existed at the beginning. Other reversals are provided at points $85^2$ and $85^3$ as shown, where additional wires are omitted.

It will be understood that the principles of this invention can be applied wherever different wires alternate in the wire set and different warps are raised over one character of wires in different pattern areas. The form of Figure 20 will differ from the form of Figure 19 in that it omits a pile row, whereas the form of Figure 19 has no pile row omitted.

Figure 21:
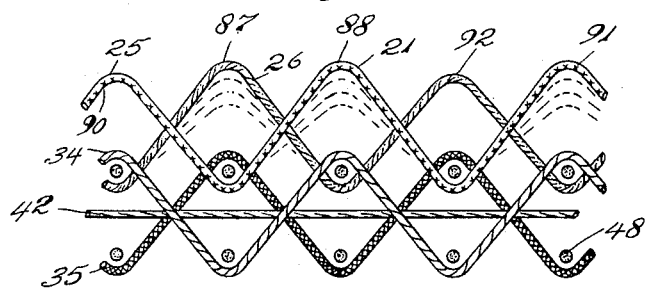
Figure 21 is a warpwise diagram of the final weave in accordance with Figure 19 at a point of reversal of the alternation of wires with respect to pile warps.

Figure 21 shows a weave in accordance with Figure 19 at a point at which two pile wires of the same character (for example wavy pile wire) are adjoining. The weave produced in Figure 21 will preferably correspond with Figure 9, 10 or 11 as the case may be, depending upon the other features included, except at the point at which two wires of the same character adjoin. The condition at this point is shown at Figure 21. Thus, in Figure 21 pile warp 26 is raised over a wavy wire to form a series of wavy pile projections 87 varying in height in the same transverse row, at least some of which are loops. The next wire over which pile warp 25 is raised is also a wavy wire forming pile projections 88 which vary in height in the same transverse row and at least some of which are loops. Prior to this position, pile warp 25 was always raised over straight wires in pile projections 90, but it has now shifted its relationship to the character of wires, and from henceforth, until the next reversal, pile warp 25 is raised over wavy wires to form loops varying in height in the same transverse row as shown at 91. Likewise pile warp 26 which, in the previous pattern area, had been raised over wavy wires to form wavy pile projections 87, is now raised over straight wires to form uniform pile projections 92. The wavy and straight wires have the characteristics previously discussed.

Figure 22:
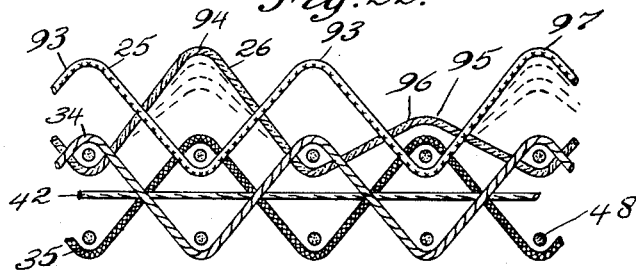
Figure 22 is a warpwise diagram of the final weave according to Figure 21 at a point of reversal of the alternation of the wires with respect to the particular pile warps.

Figure 22 shows the situation at a point of reversal in Figure 20. At other points the weave will correspond to Figure 9, 10 or 11 as the case may be. As here shown, pile warp 25 has been raised over straight wires to form uniform pile projections 93. Pile warp 26 has been raised over wavy wires to form wavy pile projections 94. At point 95, where a wire would normally be used, the wire is omitted and pile warp 26 is woven into the back of the fabric at 96. The next wire is a wavy wire, but instead of pile warp 26 being raised over it, pile warp 25 is raised over it to form wavy pile projections 97. Thus the relationship between the pile warps and the wires has been reversed, and continues thus until the next reversal.

The loom used to accomplish the weave of Figures 20 and 22 may be a standard Wilton, velvet or tapestry carpet loom as well known, such as the Crompton and Knowles, or the Dobcross (shown for instance in C. H. Masland, 2nd, U. S. patent application Serial No. 144,764, filed February 17, 1950, for Weaving With Effect From Orientation Of High And Low Pile, incorporated herein by reference).

Figures 23 to 28 illustrate a wire motion which may be used in accordance with the present invention. This wire motion can be employed for the normal insertion and withdrawal of the wires, and can also determine a miss in the wire sequence in accordance with the pattern requirements as indicated in Figure 20.

Figure 23 illustrates the withdrawal of the last wire at the spike roll side of the set of wires, at which time, if the wire is a wavy wire, the adjoining loops are pulled down by the high points on the wavy wire as previously explained.

For the withdrawal from wire set 98' in carpet fabric 99 of wire 98, which is the next wire to be inserted in the shed, hopper 100 begins to travel to the right in Figure 23 as indicated by arrow 101 along hopper slide 102 under the action of hopper linkage 103 connected to the cam wire motion of the loom as well known. The head 104 of resilient wire 98 is grasped by hook 105 which is constructed as well known to grasp on motion of the hook to the right relative to the wire but to release by its cam surface on motion of the wire to the right relative to the hook. The hook slides on hook slide 106 in the direction of arrow 107 under the action of hook linkage 108 connected to the plate of the wire motion as well known.

As the hook moves out to the right in Figure 23 it gradually overtakes the hopper and inserts the head 104 of the wire between the hopper fixed lower jaw 110 (Figure 25) and the hopper movable upper jaw 111 pivoted at 112 on the hopper back 113. The upper jaw 111 is spring urged toward grasping position by hairpin spring 114 acting from an abutment on the back of the hopper. The guiding relationship of the hopper on the slide 102 is maintained by hopper front 115 which is suitably secured in spaced relation to the hopper back on the opposite side of the slide.

The continued motion of the hopper to the right in Figure 23 beyond the position reached by the hook detaches the wire from the hook by moving it over the cam surface of the hook as well known, so that the wire is held at the head end entirely by the hopper. When the wire has been fully withdrawn from the fabric 99, the front end of the wire is carried toward the shed as shown in Figure 24 in the direction of arrow 117 by the forward motion of carrier 118 as well known in the art. The hopper linkage 103 moves the hopper toward the left in Figure 24 in the direction of arrow 120, inserting the wire in the shed on the spear as well known. Hook 105 also moves toward the left in Figure 24 to reach a position to engage the next wire for withdrawal as shown in Figure 23. Carrier 118 moves to the retracted position in Figure 23 as well known.

The wire motion as thus far described can be conventional notwithstanding that the wires in the wire set are unusual in character. Where desired, however, the wire motion can be employed to omit a wire in order to change the relation of wires to warps.

A shaft 121 which turns continuously is rotatably mounted on bearings 122 and supports a longitudinally moving clutch element 123 (Figure 26) which is keyed on the shaft and slidable with respect to the shaft under the action of fork 124 engaging in slot 125 in the circumference of the clutch. The fork is spring urged toward disengaging position by tension spring 126, and carries roller follower 127 which engages cam 128 on cam shaft 130 turning in suitable bearings. Shaft 130 is any one of the shafts on the loom which moves through one rotation for each cycle of motion of the hopper.

Clutch element 123 has a frictional face 131 which in engaging position engages and turns mating clutch face 132 on driven pattern chain shaft 133, journalled in bearings 133'. Pattern chain sprocket 134 is mounted on shaft 133. Ratchet 135 on the shaft engages pawl 136 pivotally mounted at 137 and spring urged into ratchet engagement by a spring not shown. The ratchet and pawl merely function to prevent the shaft 133 from moving in the reverse direction when free from driving engagement.

The sprocket 134 carries a pattern chain 138 which has normal links 140 at all positions at which the wire mechanism is to function in the normal manner without missing a wire. The clutch and cam will advance the pattern chain one link for each cycle of the hopper. The opposite end of the pattern chain can be guided by another sprocket (not shown) if desired. At positions at which it is desired to miss a wire as illustrated in Figure 20, a wire miss dog 141 is provided on a special link, extending radially beyond the ordinary pattern link. The dog 141 engages lever 142 which is pivoted on fixed pivot 142' and is urged into engagement with the pattern chain by tension spring 143 from a suitable spring abutment. At the opposite end of the pivot, the lever 142 has an offset 144 to bring the remote end into the position at which the hook engages the wire head for withdrawal of the wire, and at the remote end the lever carries a shutter 145. During normal operation of the wire motion, the shutter is in the dot-and-dash position of Figure 28 and remains inoperative when normal pattern links engage the lever 142, but when a dog 141 engages the lever 142 the shutter extends over head opening 146 of wire head 104 as shown in Figure 28, thus preventing hook 105 from entering the wire head, and causing the hook to miss, so that no wire is inserted in the shed at that position on the weave.

In operation of the form of Figures 23 to 28 inclusive, it will be understood that normally the hook withdraws the wire carrying it to the right in Figure 23, where it is picked up by the hopper and leaves the hook. The forward end of the wire is then carried toward the shed as in Figure 24 and the hopper moves to the left in Figure 24 and inserts the new wire in the shed.

When a wire miss is to be encountered, the pattern chain 138 brings a link provided with a wire miss dog 141 into the position as shown in Figures 27 and 28, thus bringing shutter 145 into obstructing position so that the next time the hook moves into engaging position to withdraw a wire, it cannot enter the wire opening and fails to withdraw a wire at that position.

Figure 29 shows a modification of the wire miss mechanism, which is employed in the invention. The form of Figure 29 is used with the normal wire motion of Figures 23 and 24, but without the shutter there shown. Wire head 104' is here modified so that wire $98^2$ has a recess 147 extending from the bottom which is normally engaged by the hook 105. In ordinary operation of the wire motion this recess is free to receive the hook as explained in normal operation of the device of Figures 23 and 24. When, however, a miss is to be encountered, sprocket 134 brings wire miss dog 141 on pattern chain 138 into engagement with cam head 148 on shutter plunger 150 which moves into slot 147 of the last wire head of wire $98^2$ and prevents the hook from entering slot 147 from the side. The shutter plunger is held in engagement with the pattern chain 138 by compression spring 151.

The operation of the form of Figure 29 is generally similar to that of Figures 23 to 28, the only difference being that the shutter moves into a slot from below the head of the wire instead of obstructing the wire opening at the side.

It will be understood that in designing a pattern, where the pile warps are to be taken from a beam, the pattern should be compensating, that is, the total height of pile on any one pile warp end in the wire repeat should equal the total height of pile on any other pile warp end and at any other dent. Of course it will be understood that in case the pile warp ends are distributed from spools or otherwise individually fed, the feature of employing a compensating pattern is no longer of importance.

By the invention it is possible to secure a wide variety of interesting and attractive effects, and to design carpets and other fabrics to blend effectively with various furnishings and decorating plans.

In view of my invention and disclosure, variations and modifications to meet individual whim or particular need will doubtless become evident to others skilled in the art to obtain all or part of the benefits of my invention without copying the apparatus shown, and I therefore, claim all such insofar as they fall within the reasonable spirit and scope of my claims.

Having thus described my invention, what I claim as new and desire to secure by Letters Patent is:

1. A loom having heddles including heddles for manipulating first and second pile warps and having means for raising the heddle for the first pile warp and the heddle for the second pile warp alternately into upper shed position, in combination with a set of wires having alternating first and second pile wires of different characters throughout the set, means for inserting the first pile wires in the upper shed of the first pile warp and the second pile wires in the upper shed of the second pile warp, and then reversing the relationship and inserting the second pile wires in the upper shed of the first pile warp and the first pile wires in the upper shed of the second pile warp, and means for omitting the insertion of a wire at the point of reversal of the relationship between the wires and the pile warps, thereby causing the change in relationship.

2. A loom according to claim 2, in which the said means comprises wire pattern mechanism which selectively determines the point of miss of a wire and shuttle means operated by the wire pattern mechanism and obstructing the manipulation of a wire to prevent the placement of a new wire in the shed at a particular position.

References Cited in the file of this patent

UNITED STATES PATENTS

| | | |
|---|---|---|
| 452,918 | Hilbert | May 26, 1891 |
| 2,318,499 | Keen | May 4, 1943 |
| 2,477,249 | Harding | July 26, 1949 |
| 2,546,261 | Groat | Mar. 27, 1951 |
| 2,553,303 | Crawford | May 15, 1951 |
| 2,573,841 | Groat | Nov. 6, 1951 |

FOREIGN PATENTS

| | | |
|---|---|---|
| 269,285 | Germany | Jan. 16, 1914 |